June 6, 1967　　F. H. SOYKAN　　3,323,393
FOUR-LINK BORING BAR

Filed Oct. 18, 1965　　　　　　　　　　　　2 Sheets-Sheet 1

INVENTOR.
FERHUN H. SOYKAN
BY

ATTORNEY.

June 6, 1967 F. H. SOYKAN 3,323,393
FOUR-LINK BORING BAR
Filed Oct. 18, 1965 2 Sheets-Sheet 2

INVENTOR.
FERHUN H. SOYKAN
BY

ATTORNEY.

United States Patent Office 3,323,393
Patented June 6, 1967

3,323,393
FOUR-LINK BORING BAR
Ferhun H. Soykan, Bridgeport, Conn., assignor to The Bullard Company, Bridgeport, Conn., a corporation of Connecticut
Filed Oct. 18, 1965, Ser. No. 497,410
7 Claims. (Cl. 77—1)

This invention relates to machine tools, and particularly to an improved retractable boring bar for machine tools.

In the use of multiple preset tooling for performing operations on a workpiece, a boring bar is often required. Usually, multiple tooling including a boring bar, when such is required, is mounted on a single platen that is moved through a cycle of operations for causing the various tools to perform various operations on the workpiece. In the cyclic movement of the platen, the boring bar often interferes with the work in moving the platen to a position for other tools to perform their functions.

The principal object of the present invention is to provide a retractable boring bar that will normally be maintained in retracted position until its use is needed, whereupon it is brought into position for operating on the workpiece, after which the boring bar is retracted so that it does not interfere with the succeeding operations that are performed on the workpiece by other tools.

Another object of the invention is to provide such a retractable boring bar that will be maintained in rigid, fixed position while functioning so as to produce accurate boring operations.

Still another object of the invention is to provide such a retractable boring bar that is moved into and out of operative position by fluid-operated means.

Another object of the invention is to provide such a retractable boring bar embodying adjustments thereof to overcome wear and deflection of the bar during use.

A further object of the invention is to provide such a retractable boring bar which when moved to its operative position, will effectively resist forces in all directions.

In one aspect of the invention, a platen may be attached to a slide of a machine tool for movement along intersecting axes so that the platen can move universally in a plane. A plate may be attached to the platen in a manner to permit slight oscillatable movement thereon for making slight lateral adjustments of the boring bar that is attached to the plate.

In another aspect of the invention, the plate may include spaced flanges between which a pivot pin is located. A holder for a boring bar may be pivotally mounted on the pin such that when in its vertical position, its one side engages the plate attached to the platen so as to accurately locate the pivotal holder in a vertical position.

In a still further aspect of the invention, another pivot pin extending between the flanges may pivotally support a link, the opposite end of such link being adapted to pivotally support the midpoint of a bellcrank lever.

In a further aspect of the invention, the end of one arm of the bellcrank lever is adapted to be pivotally connected to the boring bar holder at a point such that a line passing through such pivot point and the pivotal midpoint of the bellcrank lever makes a right angle with a line passing through the point of connection between the bellcrank lever and the boring bar holder and through the pivot point of the boring bar holder when the latter is in its vertical position.

In another aspect of the invention, the end of the other arm of the bellcrank lever may be pivotally connected to one end of a piston rod, the piston of which is adapted to reciprocate within a cylinder that is also pivotally mounted between the flanges of the plate that is connected to the platen.

The pivot point for the link that pivotally supports the center of the bellcrank lever is adapted to comprise an eccentric, and the same link is adapted to include adjustable means for limiting the movement of said link toward the platen. The construction and arrangement of the parts are such that with the piston at the upper end of its stroke within the pivotally mounted cylinder, the bellcrank forces the boring bar support into a vertical position with its one surface in contact with the plate that is mounted on the platen. In this position, the one arm of the bellcrank and its pivotally supporting link is in a location such that the connection between the two is slightly beyond "dead center," thus locking the boring bar support in operating position. As the piston within the cylinder moves toward the opposite end of its stroke, it initially causes the pivotally mounted link that supports the bellcrank to move in a counterclockwise direction, breaking the past-dead-center locking position between the pivotal link and the bellcrank lever. Continued upward movement of the piston within the pivotally mounted cylinder causes the boring bar support to pivot about its pivotal pin to remove it from effective position and so that it will not interfere with the work when other tools on the platen are brought into positions to perform operations on the work.

The above, other objects and novel features of the invention will become apparent from the following specification and accompanying drawings which are merely exemplary.

Figure 1:
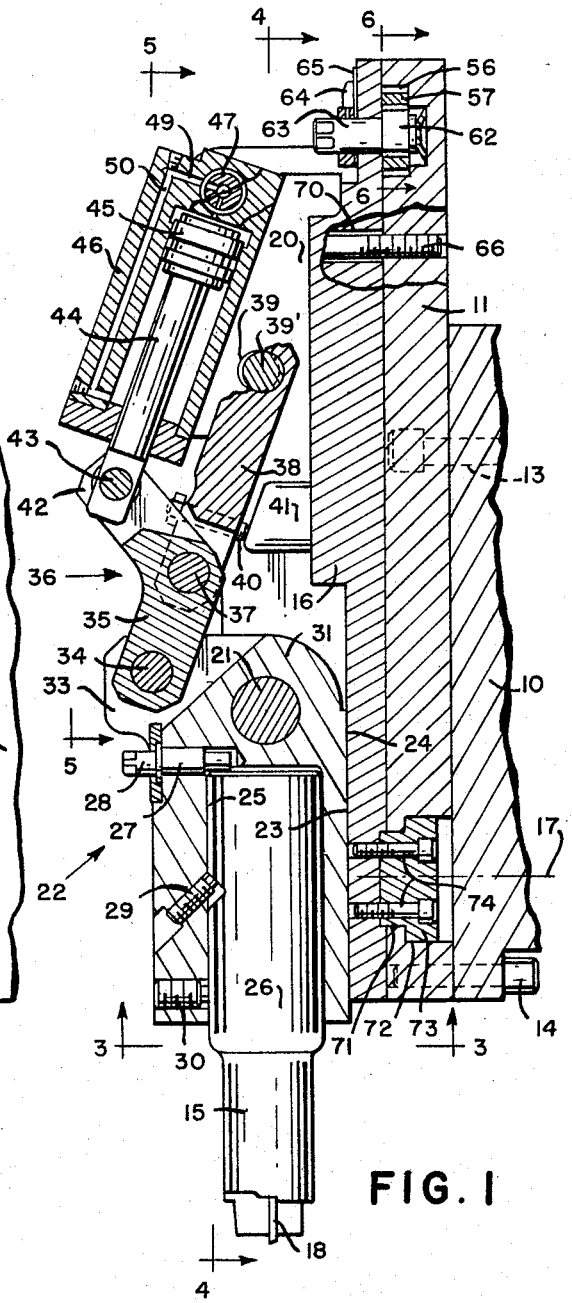
FIG. 1 is a sectional elevational view of a boring bar to which the principles of the invention have been applied.

Referring to the drawings, and particularly to FIG. 1, the principles of the invention are shown as applied to a machine tool including a slide 10 that may be mounted on a machine tool for movement along intersecting axes so that it can be moved universally in a vertical plane. A platen 11 is fixed to the slide 10 by screws 13 and 14. Platen 11 may support a plurality of tools adapted to be employed in a program of operations to produce the desired workpiece. One of such tools may comprise a boring bar 15 which is adapted to be moved into the position shown in FIG. 1 when its effectiveness is needed, and to be moved into the position shown in FIG. 2 when it is not required.

In order to support the boring bar 15, a plate 16 may be mounted on platen 11 in a manner to permit its slight oscillatory movement about an axis 17 for providing lateral adjustment of the cutting tip 18 of boring bar 15 as will be explained later.

The plate 16 may include spaced flanges or side walls 19 and 20 (FIG. 4) between which and at the lower end of which flanges a pin 21 may be mounted. The pin 21 may pivotally support a boring bar holder 22 in a manner such that when it is vertically positioned, its one surface 23 abuts against a surface 24 of plate 16, restricting the counterclockwise motion of the support 22 about pivot pin 21 and maintaining the bar 15 within support 22 in a vertical position. The support 22 may include a bore 25 adapted to receive the shank 26 of boring bar 15. An eccentric stud 27 mounted in the support 22 may engage the top of shank 26, and it may include an end 28 adapted to receive a wrench for turning the eccentric stud 27. Rotary motion of stud 27 will cause slight vertical adjustment of boring bar 15. The shank 26 of boring bar 15 is held in adjusted position against the eccentric stud 27 by a set screw 29 and is locked in position by another set screw 30.

Figure 2:
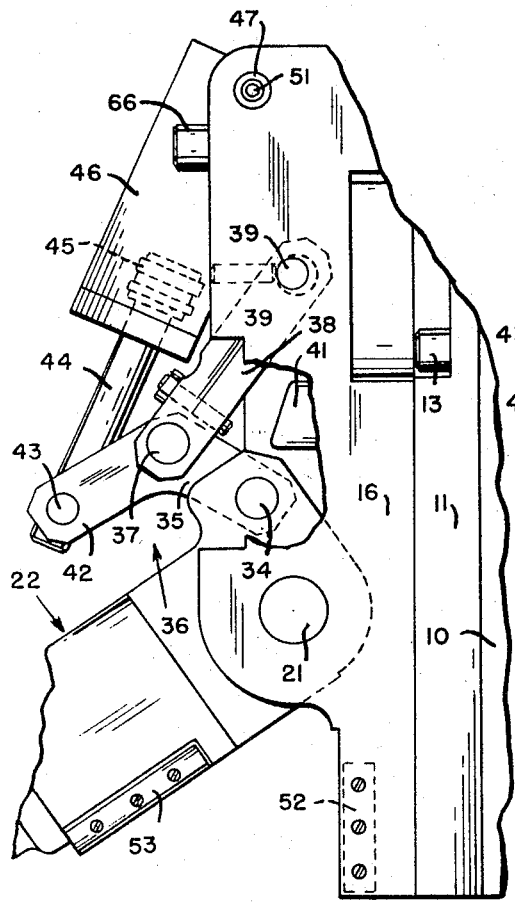
FIG. 2 is a view similar to FIG. 1, with the boring bar support in its retracted position.

The upper end of support 22 is provided with an arcuate surface 31 undercut in a manner such that the support 22 can be moved in a clockwise direction about the pin 21 from the position shown in FIG. 1 to the position shown in FIG. 2 without interfering with the surface 24 of plate 16. The support 22 may include spaced ear means 33 that are pivotally connected by a pin 34 to one arm 35 of a bellcrank lever 36. The midpoint of bellcrank lever 36 may be connected pivotally to a pin 37 that is also connected to one end of a pivotal link 38. The opposite end of link 38 is pivotally connected to a pin 39 that extends between the walls or flanges 19 and 20 of the plate 16. Link 38 may include adjusting screws 40 that cooperate with an abutment 41 integral with plate 16. Screws 40 limit the counterclockwise movement of link 38 and are set so that the pin 37 moves slightly beyond "dead center" in a counterclockwise direction about the pin 39 so as to lock the linkage and prevent clockwise movement of the boring bar 15 when subjected during a working operation to forces that tend to move it in such a direction. Additionally, the pin 39 may include an eccentric 39' whereby the linkage including link 38 and bellcrank 36 can be preloaded so as to remove all "play" when the linkage is in the position shown in FIG. 1.

Bellcrank 36 may include another arm 42, the free end of which is connected through a pin 43 to the end of a piston rod 44. A piston 45 at the opposite end of rod 44 is adapted to reciprocate within a cylinder 46, and the cylinder 46 is adapted to be pivotally mounted on a pin 47 that extends between flanges 19 and 20 of plate 16. Fluid under constant pressure is adapted to be admitted to a passage 48 (FIG. 4) of the pin 47. Passage 48 communicates with a pasage 49 (FIG. 1) that in turn is connected to a passage 50 leading to the bottom of the cylinder 46 and opening into the cylinder on the rod side of the piston 45.

A passage 51 (FIG. 4) within the pin 47 admits pressure fluid to the cylinder 46 on the blank end of piston 45. The admission of pressure fluid to the passage 51 is controlled by valve mechanism (not shown) that is operated by cam means during the cycle of operation of the work being performed. Admission of pressure fluid to the passage 51 at the same pressure as the constant pressure acting in line 48 produces a resultant force moving the piston 45 and rod 44 in a manner to cause counterclockwise movement of the bellcrank 36. This initially breaks the locked condition of the arm 35 and link 38, causing the link 38 to move in a clockwise direction about pin 39. Continued counterclockwise movement of bellcrank 36 turns the boring bar holder 22 in a clockwise direction about the pivot pin 21, thereby retracting the boring bar 15 from its working position.

When the valve controlling the flow of pressure fluid to the line 51 is exhausted, the constant pressure in passage 48 acts on the rod end of piston 45, producing a force of much greater intensity. The bellcrank lever 36 turns in a clockwise direction, turning both the link 38 and the boring bar holder 22 in a counterclockwise direction until the surface 23 on the boring bar holder 22 contacts surface 24 on the plate 16, and the pivot pin 37 is caused to be moved slightly beyond "dead center" thereby locking the bar 15 in its vertical effective position.

Figure 3:
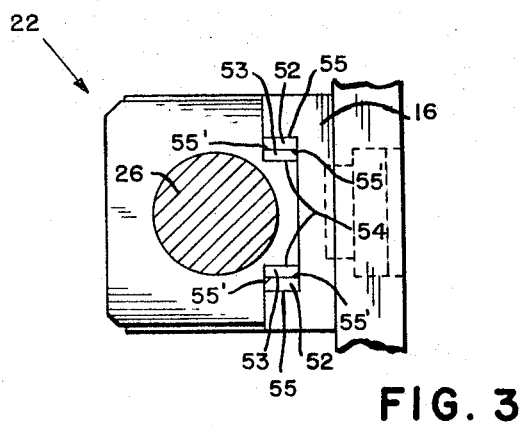
FIG. 3 is a view looking in the direction of the arrows along line 3—3 of FIG. 1.

Referring to FIGS. 2 and 3, shoe elements 52 and 53 may be located along interlocking surfaces 54 and 55 between the plate 16 and the sides of boring bar holder 22. The shoes 52 and 53 are provided with tapers 55' to facilitate their mating with each other, and these shoes 52 and 53 are for the purpose of maintaining rigidity of the boring bar holder 22 at right angles to the plane of the paper relative to FIG. 1.

Figure 6:
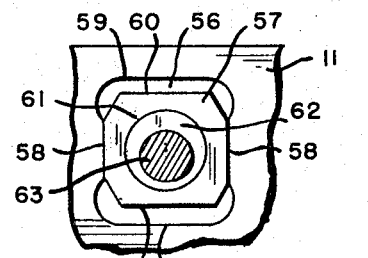
FIG. 6 is a sectional view taken substantially along line 6—6 of FIG. 1.

Referring to FIG. 6, the platen 11 may include a rectangular recess 56 therein, in which a shoe 57 is mounted for limited vertical motion but restrained against horizontal motion. To effect this, the recess 56 includes opposed ways 58 that slidingly contact opposed sides of shoe 57, and the opposed walls 59 of recess 56 are spaced from the opposed walls 60 of shoe 57. The shoe includes a circular passage 61 that receives a circular disc 62 having an eccentric integral shaft 63 that is journaled in a bearing in plate 16. A pointer 64 fixed to shaft 63 cooperates with a dial 65 (FIG. 1).

Figure 4:
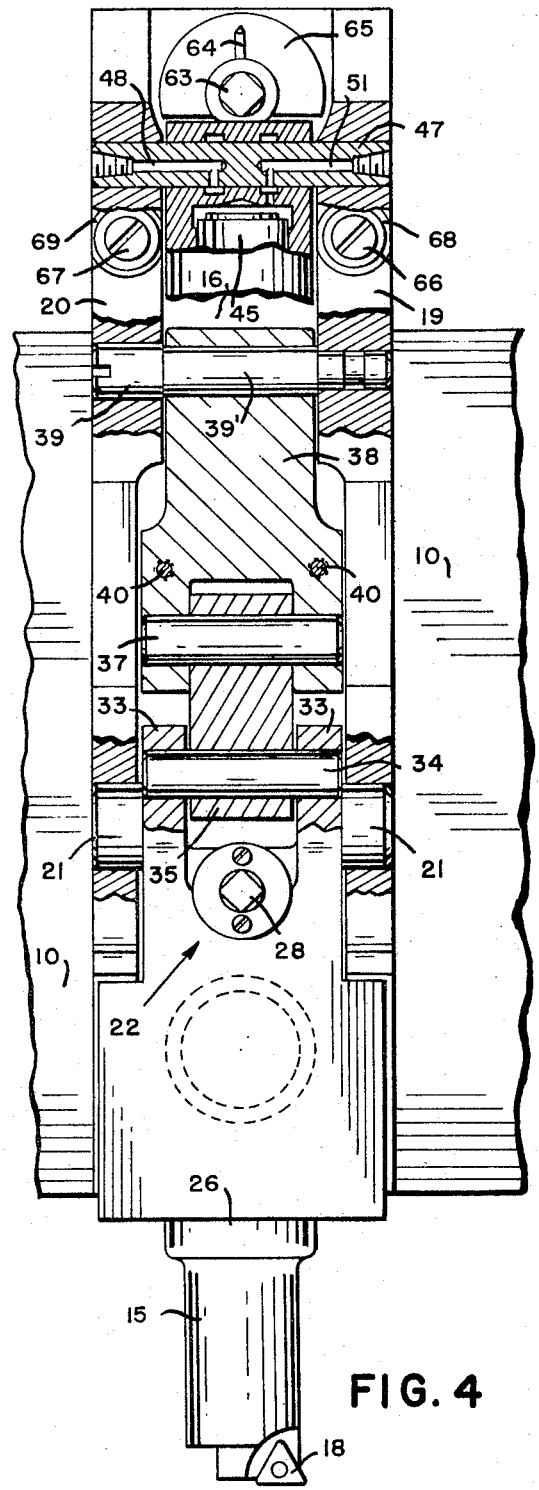
FIG. 4 is a sectional plan view taken substantially along line 4—4 of FIG. 1.
Figure 5:
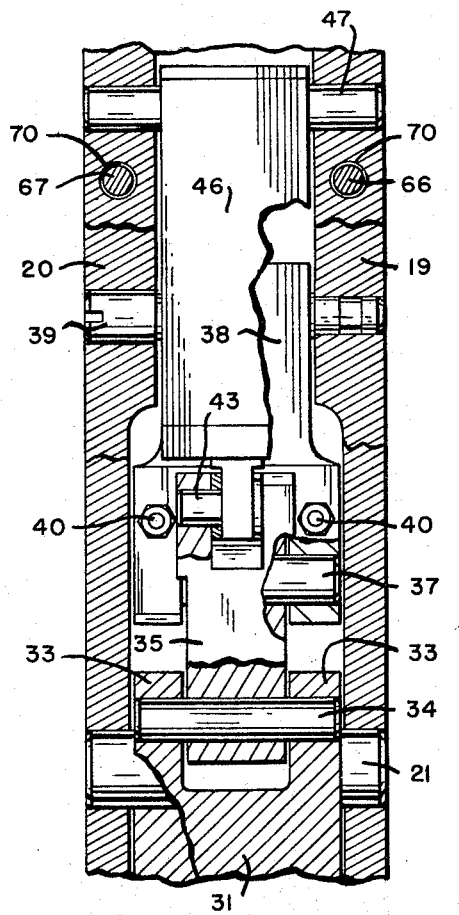
FIG. 5 is a sectional plan view taken substantially along line 5—5 of FIG. 1.

Referring to FIGS. 1 and 4, cap screws 66 and 67 have their heads received within counterbored holes 68, 69 (FIG. 4) in walls 19 and 20. Screws 66 and 67 extend through holes 70 in plate 16 of greater diameter than the screws and are threaded into platen 11. This provides a clearance around each screw 66 and 67 for a purpose to be described later.

Referring to FIG. 1, the platen 11 is provided with a bore 71 and a counterbore 72 for receiving a stepped cylindrical element 73. Element 73 is fixed to plate 16 by cap screws 74.

The turning of eccentric shaft 63 moves plate 16 about the center of element 73 to provide lateral adjustment of the cutting tip 18. The clearance around screws 66 permits this adjustable movement, which is occasioned by overcoming the friction between plate 16 and platen 11 when eccentric shaft 63 is turned.

Although the various features of the improved retractable boring bar have been shown and described in detail to fully disclose one embodiment of the invention, it will be evident that changes may be made in such details, and certain features may be used without others without departing from the principles of the invention.

What is claimed is:

1. Retractable tool supporting apparatus comprising in combination a platen adapted to be attached to a movable member of a machine tool for movement along intersecting axes; a plate mounted on said platen for limited movement in an arcuate path relative thereto; means between said plate and platen for providing said relative arcuate movement; a boring bar holder pivotally mounted on said plate for movement between a working position adjacent said plate and a retracted position away from said plate; fluid-operated means mounted on said plate; and linkage means connecting said fluid-operated means and said boring bar holder for moving said holder between said working and retracted positions; said linkage means comprising a bellcrank lever, a toggle link, and means pivotally connecting said toggle link to said plate; said bellcrank lever having one arm with an end pivotally connected to said fluid-operated means, another arm with an end pivotally connected to said boring bar holder, and said bellcrank lever being pivotally connected intermediate said arms to said toggle link.

2. The apparatus set forth in claim 1 wherein said means for providing said arcuate movement of said plate relative to said platen comprises pivot means connecting said plate to said platen and rotatable eccentric means spaced from said pivot means for moving said plate relative to said platen about said pivot means.

3. The apparatus set forth in claim 1 wherein said boring bar holder includes a surface engageable with a surface of said plate for locating said boring bar holder in the working position.

4. The apparatus set forth in claim 1 additionally including adjustable eccentric means mounted in said boring bar holder adapted to abut against a surface of a shank portion of a boring bar disposed within said holder whereby said boring bar may be adjustably positioned relative to said holder.

5. The apparatus set forth in claim 1 wherein said fluid-operated means comprises a piston and cylinder pivotally mounted on said plate.

6. The apparatus set forth in claim 1 wherein said means pivotally connecting said toggle link to said plate includes an eccentric portion adjustably mounted relative to said toggle link for adjustably preloading said link towards its pivotal connection with said bellcrank when said boring bar holder is in the working position.

7. The apparatus set forth in claim 6 additionally including adjustable means for positioning said toggle link past dead center when said boring bar holder is in the working position to restrain said holder from being displaced from said working position.

References Cited
UNITED STATES PATENTS

| | | | |
|---|---|---|---|
| 953,117 | 3/1910 | Bissell | 90—55 |
| 1,637,785 | 8/1927 | Randolph et al. | 90—52 |
| 2,533,680 | 12/1950 | Morey et al. | 90—55 |
| 2,953,950 | 9/1960 | Briney et al. | |

WILLIAM W. DYER, JR., *Primary Examiner.*

G. A. DOST, *Assistant Examiner.*